United States Patent
Mansour (10) Patent No.: US 11,483,644 B1
(45) Date of Patent: Oct. 25, 2022

(54) FILTERING EARLY REFLECTIONS

(71) Applicant: Amazon Technologies, Inc., Seattle, WA (US)

(72) Inventor: Mohamed Mansour, Cupertino, CA (US)

(73) Assignee: Amazon Technologies, Inc., Seattle, WA (US)

(*) Notice: Subject to any disclaimer, the term of this patent is extended or adjusted under 35 U.S.C. 154(b) by 22 days.

(21) Appl. No.: 17/222,275

(22) Filed: Apr. 5, 2021

(51) Int. Cl.
*H04R 3/00* (2006.01)
*H04R 1/32* (2006.01)
*H04B 3/20* (2006.01)

(52) U.S. Cl.
CPC ............ *H04R 1/32* (2013.01); *H04R 3/005* (2013.01)

(58) Field of Classification Search
CPC .................................. H04R 1/32; H04R 3/005
USPC ........................................................ 381/92, 66
See application file for complete search history.

(56) References Cited

U.S. PATENT DOCUMENTS

2018/0182411 A1* 6/2018 Kaskari ............... G10L 21/0264

* cited by examiner

*Primary Examiner* — Ammar T Hamid
(74) *Attorney, Agent, or Firm* — Pierce Atwood LLP

(57) ABSTRACT

A system that performs early reflections filtering to suppress early reflections and improve sound source localization (SSL). During music playback and/or when a device is placed in a corner, acoustic reflections from nearby surfaces get boosted due to constructive interference, negatively impacting SSL and other processing of the device. To suppress these early reflections, the device uses an Early Reflections Filter (ERF) that makes use of Linear Prediction Coding (LPC), which is already being performed during speech processing. For example, the device generates raw audio signals using multi-channel LPC coefficients and then uses single-channel LPC coefficients for each raw audio signal in order to generate a filter that estimates the reflections. The device then uses this filter to suppress the early reflections and generate filtered audio signals, thus resulting in better audio processing and better overall device performance.

20 Claims, 6 Drawing Sheets

FILTERING EARLY REFLECTIONS

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

DETAILED DESCRIPTION

Electronic devices may be used to capture audio data and generate audio. For example, an electronic device may generate audio using loudspeakers and may capture audio data using one or more microphones. If the electronic device is located in the vicinity of hard surfaces (e.g., walls, ceiling, shelves, etc.), the presence of acoustically reflective surfaces negatively impacts performance of the electronic device. For example, the presence of acoustically reflective surfaces can have a negative effect on both speech recognition performance and sound quality, and reflections from the acoustically reflective surfaces can confuse sound source localization. As a result, the device may be unable to accurately locate a user.

To improve a user experience, devices, systems and methods are disclosed that perform early reflections filtering to improve sound source localization (SSL). For example, the device uses an Early Reflections Filter (ERF) that makes use of Linear Prediction Coding (LPC), which is already being performed during speech processing, to suppress early reflections. For example, the device generates raw audio signals using multi-channel LPC coefficients and then uses single-channel LPC coefficients for each raw audio signal in order to generate a filter that estimates the reflections. The device then uses this filter to generate filtered audio signals that suppress the early reflections, thus resulting in better audio processing and better overall device performance.

Figure 1:
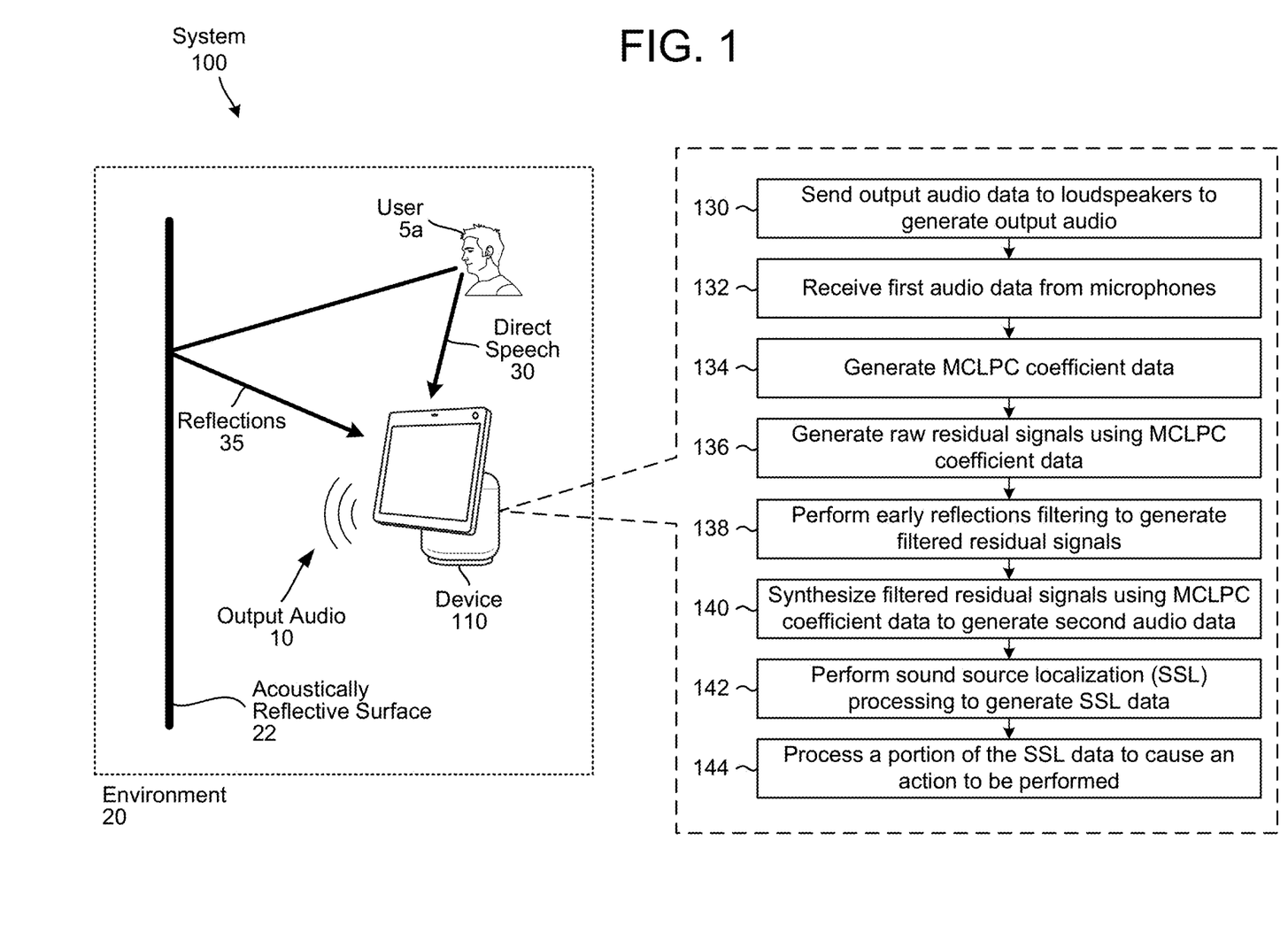
FIG. 1 illustrates a system for performing early reflections filtering according to embodiments of the present disclosure.

FIG. 1 illustrates a system for performing early reflections filtering according to embodiments of the present disclosure. As illustrated in FIG. 1, a system 100 may include a device 110 that has one or more microphone(s) 112 and one or more loudspeaker(s) 114. To detect user speech or other audio, the device 110 may use one or more microphone(s) 112 to generate microphone audio data that captures audio in a room (e.g., an environment) in which the device 110 is located. As is known and as used herein, "capturing" an audio signal includes a microphone transducing audio waves (e.g., sound waves) of captured sound to an electrical signal and a codec digitizing the signal to generate the microphone audio data.

The device 110 may also send playback audio data to the loudspeaker(s) 114 and the loudspeaker(s) 114 may generate audible sound(s) (e.g., output audio 10) based on the playback audio data. When the loudspeaker(s) 114 generate the audible sound(s), the microphone(s) 112 may capture portions of the audible sound(s) (e.g., an echo), such that the microphone audio data may include a representation of the audible sound(s) generated by the loudspeaker(s) 114 (e.g., corresponding to portions of the playback audio data) in addition to any additional sounds (e.g., local speech from a user) picked up by the microphone(s) 112.

As illustrated in FIG. 1, a first user 5a may generate a voice command. Some incident sound waves associated with the voice command (e.g., direct speech 30) may propagate through the air in a first direction (e.g., toward the device 110) until being detected by the microphone(s) 112 of the device 110. Other incident sound waves associated with the voice command may propagate through the air in a second direction (e.g., toward the acoustically reflective surface 22) until they reach acoustically reflective surface 22 (e.g., first wall), at which point first reflected sound waves (e.g., reflections 35) may be reflected by the first wall and propagate through the air until being detected by the microphone(s) 112 of the device 110. While not illustrated in FIG. 1, the incident sound waves may also propagate through the air in a third direction (e.g., toward a second wall) until they reach the second wall, at which point second reflected sound waves may be reflected by the second wall and propagate through the air until being detected the microphone(s) 112. Thus, the device 110 may detect first reflected sound waves associated with the first wall and may detect second reflected sound waves associated with the second wall.

When the first user 5a generates the voice command at a first time, the microphone(s) 112 may detect strong original sound waves (e.g., incident sound waves) at a second time soon after the first time, which may be referred to as "direct sound." If the device 110 is located in a center of a relatively large room (e.g., relatively large distance between the device 110 and a nearest acoustically reflective surface 22), there may be a lengthy time delay before a third time that the microphone(s) 112 detects reflected sound waves that are reflected by the acoustically reflective surfaces, which may be referred to as "reflections." As a magnitude of a sound wave is proportional to a distance traveled by the sound wave, the reflected sound waves may be relatively weak in comparison to the incident sound waves. In contrast, if the room is relatively small and/or the device 110 is located near an acoustically reflective surface, there may be a relatively short time delay before the microphone(s) 112 detects the reflected sound waves at the third time and the reflected sound waves may be stronger in comparison to the incident sound waves. If a first acoustically reflective surface is in proximity to the device 110 and a second acoustically reflective surface is distant from the device 110, the device 110 may detect "early reflections" reflected by the first acoustically reflective surface prior to detecting "late reflections" reflected by the second acoustically reflective surface. A time delay of a reflection is proportional to a distance traveled by the reflected sound waves. Thus, early reflections correspond to walls in proximity to the device 110 and late reflections correspond to walls that are distant from the device 110.

The acoustic reflections caused by surfaces in proximity to the device 110 can get boosted due to constructive interference. These reflections are more obvious during music playback and/or when the device 110 is located in a corner. Under these conditions, an Early Reflections Filter (ERF) component may attenuate the early acoustic reflections without altering the line-of-sight component that contains true SSL information, thus improving a performance of SSL estimation and other functionality of the device 110.

As illustrated in FIG. 1, the device 110 may optionally send (130) output audio data to the loudspeakers 114 to generate output audio and may receive (132) first audio data from the microphone(s) 112. While not illustrated in FIG. 1, the output audio 10 may also reflect off of the acoustically reflective surface 22 and generate additional reflections captured by the microphone(s) 112. Thus, the first audio data may be referred to as input audio data and may include a representation of the direct speech 30, a representation of the reflections 35, a representation of the output audio 10, and/or a representation of reflections of the output audio 10 without departing from the disclosure. In some examples, the microphone(s) 112 may be included in a microphone array, such as an array of eight microphones. However, the disclosure is not limited thereto and the device 110 may include any number of microphone(s) 112 without departing from the disclosure. While FIG. 1 illustrates an example in which the device 110 sends the output audio data to the loudspeakers 114 and the loudspeakers 114 generates the output audio 10, the disclosure is not limited thereto. For example, the device 110 may perform early reflections filtering when the device 110 is not generating the output audio 10 without departing from the disclosure.

The device 110 may generate (134) Multi-Channel Linear Prediction Coding (MCLPC) coefficient data using any techniques without departing from the disclosure. For example, Linear Prediction Coding (LPC) is a procedure that is used during speech processing. Thus, the device 110 may make use of the MCLPC coefficient data to perform early reflections filtering.

Using the MCLPC coefficient data, the device 110 may generate (136) raw residual signals, may perform (138) early reflections filtering to generate filtered residual signals, and may synthesize (140) the filtered residual signals using the MCLPC coefficient data to generate second audio data, as described in greater detail below with regard to FIGS. 2-3. For example, the device 110 may split the first audio data into individual channels corresponding to a single microphone and may perform early reflections filtering for each individual channel. As described in greater detail below, the early reflections filtering attenuates the early reflections while leaving the line-of-sight component associated with a direct path. After suppressing the early reflections, the device 110 may synthesize the individual channels of filtered residual signals to generate the second audio data.

The device 110 may perform (142) sound source localization (SSL) processing using the second audio data in order to generate SSL data. For example, the device 110 may perform SSL processing to distinguish between multiple sound sources represented in the second audio data, enabling the device 110 to separate a first portion of the second audio data representing the direct speech 30 from a second portion of the second audio data representing the output audio 10.

The device 110 may process (144) a portion of the SSL data to cause an action to be performed. For example, the device 110 may cause speech processing to be performed on the first portion of the second audio data, which represents the direct speech 30, in order to determine the voice command uttered by the first user 5a. The device 110 may then cause an action to be performed that is responsive to the voice command.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), noise reduction (NR) processing, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

For ease of explanation, the following descriptions may refer to the device 110 being located in a "room" and detecting walls associated with the room. However, the disclosure is not limited thereto and the device 110 may be located in an "environment" or "location" (e.g., concert hall, theater, outdoor theater, outdoor area, etc.) without departing from the disclosure.

If the device 110 includes a single loudspeaker 114, an acoustic echo canceller (AEC) may perform acoustic echo cancellation for one or more microphone(s) 112. However, if the device 110 includes multiple loudspeakers 114, a multi-channel acoustic echo canceller (MC-AEC) may perform acoustic echo cancellation. For ease of explanation, the disclosure may refer to removing estimated echo audio data from microphone audio data to perform acoustic echo cancellation. The system 100 removes the estimated echo audio data by subtracting the estimated echo audio data from the microphone audio data, thus cancelling the estimated echo audio data. This cancellation may be referred to as "removing," "subtracting" or "cancelling" interchangeably without departing from the disclosure.

In some examples, the device 110 may perform echo cancellation using the playback audio data. However, the disclosure is not limited thereto, and the device 110 may perform echo cancellation using the microphone audio data, such as adaptive noise cancellation (ANC), adaptive interference cancellation (AIC), and/or the like, without departing from the disclosure.

In some examples, such as when performing echo cancellation using ANC/AIC processing, the device 110 may include a beamformer that may perform audio beamforming on the microphone audio data to determine target audio data (e.g., audio data on which to perform echo cancellation). The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction). The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortionless Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Using the beamformer and techniques discussed below, the device 110 may determine target signals on which to perform acoustic echo cancellation using the AEC. However, the disclosure is not limited thereto and the device 110 may perform AEC without beamforming the microphone audio data without departing from the present disclosure. Additionally or alternatively, the device 110 may perform beamforming using other techniques known to one of skill in the art and the disclosure is not limited to the techniques described above.

As discussed above, the device 110 may include a microphone array having multiple microphones 112 that are laterally spaced from each other so that they can be used by audio beamforming components to produce directional audio signals. The microphones 112 may, in some instances, be dispersed around a perimeter of the device 110 in order to apply beampatterns to audio signals based on sound captured by the microphone(s). For example, the microphones 112 may be positioned at spaced intervals along a perimeter of the device 110, although the present disclosure is not limited thereto. In some examples, the microphone 112 may be spaced on a substantially vertical surface of the device 110 and/or a top surface of the device 110. Each of the microphones 112 is omnidirectional, and beamforming technology may be used to produce directional audio signals based on audio data generated by the microphones 112. In other embodiments, the microphones 112 may have directional audio reception, which may remove the need for subsequent beamforming.

Using the microphone(s) 112, the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones 112 in a microphone array.

The device 110 may include a beamformer that may include one or more audio beamformers or beamforming components that are configured to generate an audio signal that is focused in a particular direction (e.g., direction from which user speech has been detected). More specifically, the beamforming components may be responsive to spatially separated microphone elements of the microphone array to produce directional audio signals that emphasize sounds originating from different directions relative to the device 110, and to select and output one of the audio signals that is most likely to contain user speech.

Audio beamforming, also referred to as audio array processing, uses a microphone array having multiple microphones 112 that are spaced from each other at known distances. Sound originating from a source is received by each of the microphones 112. However, because each microphone is potentially at a different distance from the sound source, a propagating sound wave arrives at each of the microphones 112 at slightly different times. This difference in arrival time results in phase differences between audio signals produced by the microphones. The phase differences can be exploited to enhance sounds originating from chosen directions relative to the microphone array.

Linear Prediction Coding (LPC) is a procedure that is used during speech processing. For example, LPC coefficients (e.g., $\alpha=(\alpha_1, \alpha_2 \ldots \alpha_n)^T$) are computed using the Yule-Walker equation:

$$R \cdot \alpha = \beta \quad [1]$$

where $\beta=(\beta(1), \beta(2) \ldots \beta(n))^T$, with $\beta(k)$ denoting the k-th autocorrelation coefficient, and R is n×n autocorrelation matrix with $R_{ij}=\beta(i-j)$. The Yule-Walker equation is efficiently solved using the Levinson-Durbin algorithm, whose complexity is only $O(n^2)$. Note that the LPC factorizes the speech spectrum (e.g., X(z)) as:

$$X(z) = A(z) \cdot U(z) \quad [2]$$

where A(z) is the autoregressive model of speech, which can be computed from the LPC coefficients $\alpha$, and U(z) is a z-transform of the LPC residual (e.g., u(t)), which is a white-noise excitation signal that is computed from the speech signal as:

$$u(t) = x(t) - \sum_{l=1}^{n} a_l x(t-l) \quad [3]$$

In the presence of reverberation, the single-channel LPC coefficients combine both the autoregressive model of the source speech (e.g., A(z)) and the channel impulse response (e.g., H (z)), which hinders its modeling gain. Nevertheless, if a microphone array is used and the spacing between the microphones is large enough to randomize the room impulse responses at the different microphones, then the impact of reverberation on the LPC coefficients can be mitigated through Multi-Channel LPC (MCLPC). With MCLPC, the speech signal at the m-th mic (e.g., $X_m(z)$) is modeled as:

$$X_m(z) = A(z) U_m(z) \quad [4]$$

where $A(z)$ represents the autoregressive model of the source speech and $U_m(z)$ is the MCLPC residual at the m-th microphone, which is:

$$U_m(z) = H_m(z) U(z) \quad [5]$$

where $U(z)$ is the white-noise excitation of the source speech and $H_m(z)$ is the room impulse response between the source and the m-th microphone. As shown in Equation [5], the MCLPC residual is no longer a white-noise signal, it is the convolution of the room impulse response and a white-noise signal. Thus, it inherits all the properties of the room impulse response, while effectively removing the correlation due to the speech signal. Therefore, the MCLPC residuals at the microphones of the microphone array can be effectively used for sound source localization (SSL) estimation.

The computation of the MCLPC coefficients is simple, as they can be computed from the Yule-Walker equation as:

$$\beta(k) = \frac{1}{M} \sum_{m=1}^{M} \beta_m(k) \quad [6]$$

where $\beta(k)$ denotes the k-th autocorrelation coefficient, M is the number of microphones, and $\beta_m(k)$ is the ensemble autocorrelation at the m-th microphone. This simple modification averages out the room impulse response at the different microphones in the calculation of the MCLPC coefficients. A single set of the MCLPC coefficients (e.g., $\beta(k)$) is computed for all microphones, and the m-th residual signal (e.g., $r_m(t)$) is computed as:

$$r_m(t) = x_m(t) - \sum_{l=1}^{n} a_l x_m(t-l) \quad [7]$$

where $r_m(t)$ denotes the residual signal for the m-th microphone, $x_m(t)$ denotes the speech signal at the m-th microphone, and $a_l$ denotes an individual LPC coefficient of the LPC coefficients $\alpha$.

The acoustic reflections from surfaces in proximity to the device 110 can get boosted due to constructive interference. These reflections are more obvious during music playback and/or when the device 110 is located in a corner. Under these conditions, an Early Reflections Filter (ERF) component may attenuate the early acoustic reflections without altering the line-of-sight component that contains true SSL information, thus improving a performance of SSL estimation.

To understand the operation of the ERF component, the system 100 may make an assumption that the source signal is a known white noise signal (e.g., $u(t)$), and that the room impulse response at the m-th microphone is the filter $\{h_m(t)\}$; then the received signal at the m-th microphone is:

$$r_m(t) = \Sigma_\tau h_m(\tau) u(t-\tau) \quad [8]$$

where $r_m(t)$ denotes the residual signal for the m-th microphone.

The first few elements of the filter $\{h_m(\tau)\}$ correspond to the line-of-sight component, while the following elements correspond to the early reflections. Since $u(t)$ is white noise, this model can be approximated using:

$$r_m(t) \approx h_m(0) u(t) + \Sigma_\tau \tilde{h}_m(\tau) r_m(t-\tau) \quad [9]$$

This model enables the device 110 to remove early reflections because it does not require any knowledge of the source signal (e.g., white noise signal $u(t)$). If early reflections are confined to the range $[\tau_0, \tau_1]$, then these early reflections can be removed as:

$$\tilde{r}_m(t) = r_m(t) - \sum_{\tau=\tau_0}^{\tau_1} \tilde{h}_m(\tau) r_m(t-\tau) \quad [10]$$

where $\tilde{r}_m(t)$ denotes the filtered residual signal for the m-th microphone after performing early reflections filtering.

Thus, to remove early reflections with white noise excitation, the device 110 may compute the autoregressive coefficients in the range $[\tau_0, \tau_1]$. The room model in Equation [9] fits the conventional single-channel LPC framework, where the filter $\{\tilde{h}_m(\tau)\}_{\tau=\tau_0}^{\tau_1}$ includes the corresponding LPC coefficients after running LPC analysis with autoregressive model order $\tau_1$. A separate single-channel LPC is computed for each microphone in the microphone array to compute the filter $\{\tilde{h}_m(\tau)\}_{\tau=\tau_0}^{\tau_1}$. In this implementation, standard system identification techniques cannot be used because the input signal is unknown and the wakeword occurrence is a sparse event with a relatively short time period that is not sufficient for convergence.

To convert the source wakeword signal to white noise to fit the model of Equation [8], the device 110 uses the MCLPC coefficients described with regard to Equations [1]-[7]. As mentioned above, the room impulse responses of the different microphones are averaged out in the MCLPC calculation, and the MCLPC coefficients are approximately the LPC coefficients of the source speech without reverberation. Therefore, the residual signal at each microphone after MCLPC can be approximated by the model illustrated in Equation [8]. The MCLPC coefficients are used to synthesize the signal after removing the early reflections as in Equation [10].

Figure 2:
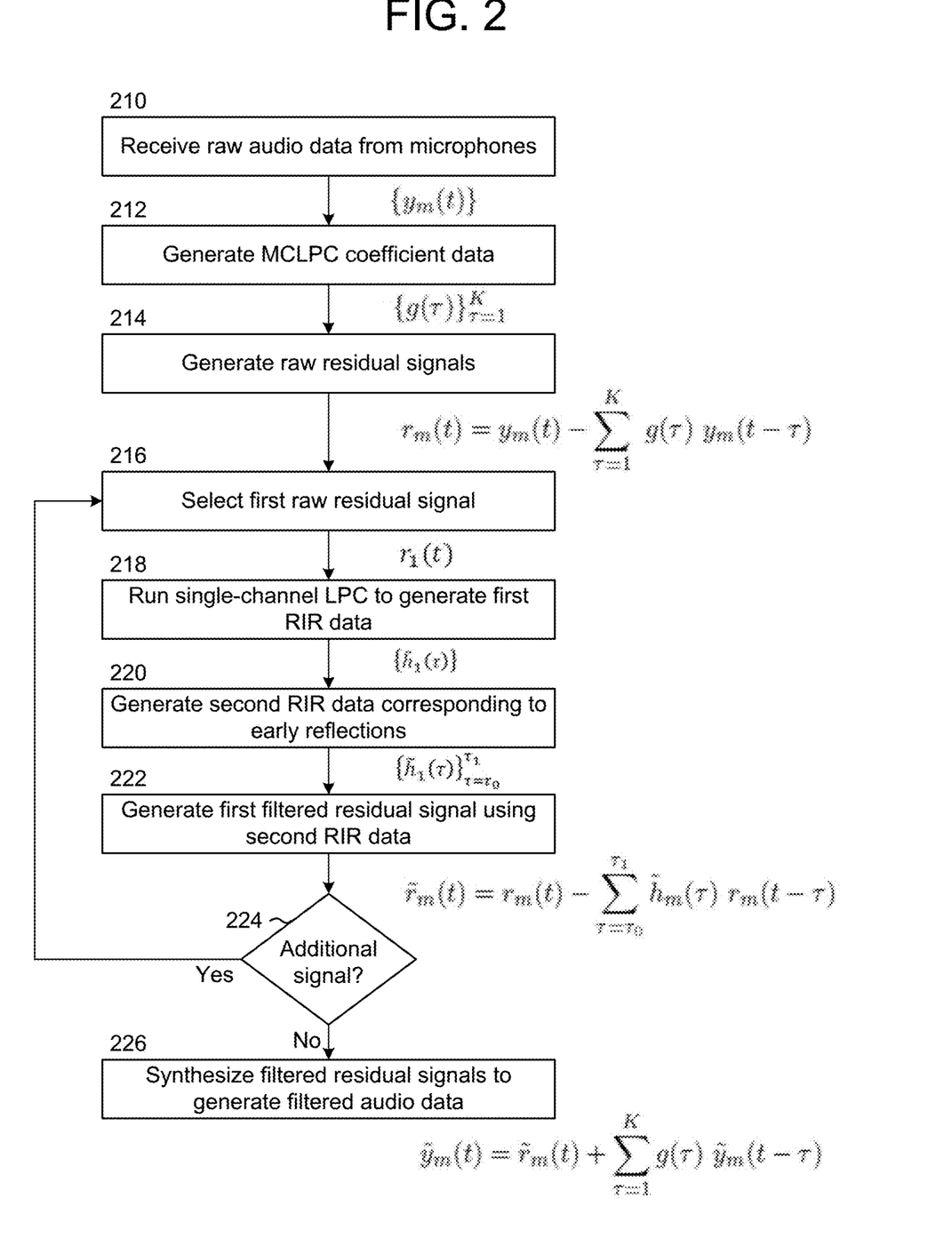
FIG. 2 illustrates a flowchart conceptually illustrating an example method for performing early reflections filtering according to embodiments of the present disclosure.

FIG. 2 illustrates a flowchart conceptually illustrating an example method for performing early reflections filtering according to embodiments of the present disclosure. As illustrated in FIG. 2, the device 110 may receive (210) raw audio data (e.g., $\{y_m(t)\}$) from the microphones 112 and may generate (212) MCLPC coefficient data (e.g., $\{g(\tau)\}_{\tau=1}^{K}$). For example, the device 110 may apply Equation [1] and Equation [6] described above to calculate the MCLPC coefficient data.

The device 110 may use the MCLPC coefficient data to generate (214) raw residual signals (e.g., $r_m(t)$). For example, the device 110 may generate an individual raw residual signal for each of the microphones using the following equation:

$$r_m(t) = y_m(t) - \sum_{\tau=1}^{K} g(\tau) y_m(t-\tau) \quad [11]$$

where $r_m(t)$ denotes the raw residual signal for the m-th microphone, $y_m(t)$ denotes a raw audio signal for the m-th microphone, and $g(\tau)$ denotes the MCLPC coefficient data. The raw residual signal $r_m(t)$ follows the signal model used in Equations [8]-[9] described above.

The device 110 may select (216) a first raw residual signal (e.g., $r_1(t)$) and run (218) a single-channel LPC to generate first room impulse response (RIR) data (e.g., $\{\tilde{h}_1(\tau)\}$). In some examples, the device 110 may generate the single-channel LPC coefficients (e.g., $\alpha=(\alpha_1, \alpha_2 \ldots \alpha_n)^T$) using Equation [1] described above, although the disclosure is not limited thereto.

The device 110 may select a portion of the first RIR data to generate (220) second RIR data (e.g., $\{\tilde{h}_1(\tau)\}_{\tau=\tau_0}^{\tau_1}$) corresponding to early reflections. To illustrate an example, a first portion of the first RIR data may correspond to a line-of-sight component (e.g., direct sound) having a direct path between an audio source and the device 110, while a second portion of the first RIR data may correspond to reflection components, which are characterized by a longer path (e.g., 20 cm longer than the direct path, although the disclosure is not limited thereto). Thus, the device 110 may generate the second RIR data using first LPC coefficients in a desired range $[\tau_0,\tau_1]$ to select the second portion of the first RIR data. To illustrate a conceptual example, if the raw audio data has a first sampling frequency (e.g., 16 kHz), the device 110 may generate the second RIR data using first LPC coefficients in a first range (e.g., $[\tau_0,\tau_1]=[10,64]$). In this example, second LPC coefficients in a second range (e.g., [1,9]) may correspond to the line-of-sight component, which includes the direct path and any components within 20 cm of the direct path, while the first LPC coefficients in the first range (e.g., [10,64]) correspond to the early reflections characterized by a path that is 20 cm longer than the direct path. However, the disclosure is not limited thereto and the sampling frequency, the first range, the second range, a length used as a threshold value (e.g., 20 cm), and/or other variables may change without departing from the disclosure.

As illustrated in FIG. 2, the device 110 may use the first LPC coefficients in the first range $[\tau_0,\tau_1]$ to compute the second RIR data (e.g., $\{\tilde{h}_1(\tau)\}_{\tau=\tau_0}^{\tau_1}$) included in Equation [10]. For example, the device 110 may compute the LPC coefficients (e.g., autoregressive coefficients) in the first range $[\tau_0,\tau_1]$, such that the second RIR data (e.g., $\{\tilde{h}_1(\tau)\}_{\tau=\tau_0}^{\tau_1}$) includes the corresponding LPC coefficients after running LPC analysis with autoregressive model order $\tau_1$. As illustrated in FIG. 2, a separate single-channel LPC is computed for each of the microphones 112 in order to generate RIR data (e.g., $\{\tilde{h}_m(\tau)\}_{\tau=\tau_0}^{\tau_1}$) for each of the raw residual signals. Thus, the second RIR data enables the device 110 to suppress the early reflections while leaving the line-of-sight components for each of the raw residual signals.

Using the first raw residual signal (e.g., $r_1(t)$), the device 110 may generate (222) a first filtered residual signal (e.g., $\tilde{r}_1(t)$) using the second RIR data. For example, the device 110 may use the first raw residual signal and the second RIR data to generate a first reference audio signal that represents the early reflections (e.g.

$$\sum_{\tau=\tau_0}^{\tau_1} \tilde{h}_m(\tau) r_m(t-\tau)$$

as shown in Equation [10]. After determining the first reference audio signal, the device 110 may subtract the first reference audio signal from the first raw residual signal to generate the first filtered residual signal. However, the disclosure is not limited thereto and the device 110 may calculate the first filtered residual signal as a single step without departing from the disclosure. In some examples, the device 110 may use a 16 kHz sampling frequency and compute the first filtered residual signal using a first range (e.g., $[\tau_0,\tau_1]=[10,64]$), although the disclosure is not limited thereto.

After generating the first filtered residual signal, the device 110 may determine (224) whether there is an additional raw residual signal and, if so, may loop to step 216 and repeat steps 216-222 for the additional raw residual signal. If the device 110 determines that there are no additional raw residual signals, the device 110 may synthesize (226) filtered residual signals to generate filtered audio data (e.g., $\{\tilde{y}_m(t)\}$). For example, the device 110 may synthesize the filtered residual signals (e.g., without the early reflections) using the MCLPC coefficients (e.g., $\{g(\tau)\}_{\tau=1}^{K}$) to generate the filtered audio data using the following equation:

$$\tilde{y}_m(t) = \tilde{r}_m(t) + \sum_{\tau=1}^{K} g(\tau) \tilde{y}_m(t-\tau) \quad [12]$$

where $\tilde{y}_m(t)$ denotes the filtered audio data for the m-th microphone, $\tilde{r}_m(t)$ denotes the filtered residual signal for the m-th microphone, and $g(\tau)$ denotes the MCLPC coefficient data.

Figure 3:
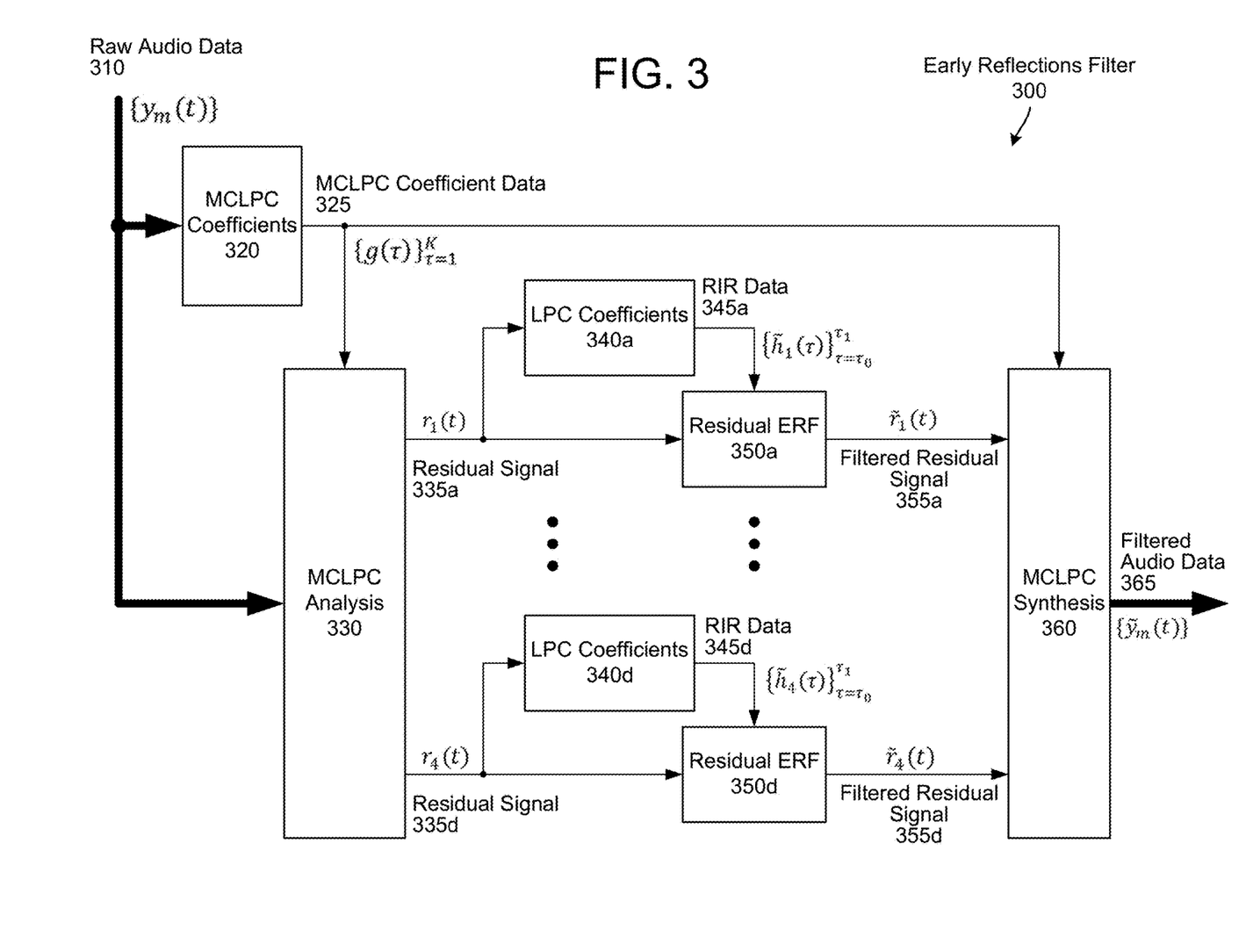
FIG. 3 illustrates an example component diagram for an early reflections filter according to embodiments of the present disclosure.

FIG. 3 illustrates an example component diagram for an early reflections filter according to embodiments of the present disclosure. For example, the device 110 may include an Early Reflections Filter (ERF) component 300 configured to perform the early reflections filtering described above with regard to FIG. 2.

As illustrated in FIG. 3, the ERF component 300 may receive raw audio data 310 (e.g., $\{y_m(t)\}$) from the microphones 112. For example, the microphones 112 may capture audible sound(s) generated by one or more sound sources and may generate raw audio data 310 representing the audible sounds. When the device 110 is generating output audio 10 (e.g., playback audio), and/or when an acoustically reflective surface 22 is located in proximity to the device 110, the raw audio data 310 may capture early reflections that negatively impacts performance of the device 110. For example, the early reflections may degrade a performance of sound source localization (SSL) estimation and/or other functionality performed by the device 110.

To illustrate an example, when the first user 5a is speaking a voice command, the microphones 112 may capture direct speech 30 (e.g., incident sound waves) corresponding to the voice command along with acoustic reflections 35 (e.g., reflected sound waves) of the voice command. Thus, the raw audio data 310 may include a first representation of the utterance (e.g., direct speech 30) along with a representation of acoustic reflections of the utterance (e.g., reflections 35). As described above, the raw audio data 310 may include two or more channels (e.g., separate audio signals) based on the number of microphones 112 used to generate the raw audio data 310. For example, the raw audio data 310 may include a first raw audio signal corresponding to a first microphone 112a and a second raw audio signal corresponding to a second microphone 112b, although the disclosure is not limited thereto.

As illustrated in FIG. 3, a Multi-Channel Linear Predictive Coding (MCLPC) coefficients component 320 may receive the raw audio data 310 and generate MCLPC coefficient data 325 (e.g., $\{g(\tau)\}_{\tau=1}^{K}$). For example, the device 110 may apply Equation [1] and Equation [6] described above to calculate the MCLPC coefficient data, as described above with regard to step 212. The MCLPC coefficients component 320 may output the MCLPC coefficient data 325 to an MCLPC analysis component 330 and an MCLPC synthesis component 360.

The MCLPC analysis component 330 may receive the raw audio data 310 from the microphones 112 and the MCLPC coefficient data 325 from the MCLPC coefficients component 320 and may generate residual signals 335 (e.g., $r_m(t)$) for each of the microphones 112. For example, the MCLPC analysis component 330 may generate a first residual signal 335a for the first microphone 112a, a second residual signal 335b for the second microphone 112b, and so on for each of the microphones, as described above with regard to step 214. While FIG. 3 illustrates an example in which the device 110 includes four microphones and generates four residual signals 335a-335d, the disclosure is not limited thereto and the number of microphones included in the device and/or used to generate the raw audio data 310 may vary without departing from the disclosure. The MCLPC analysis component 330 may generate the residual signals 335 using Equation [11] as described above. For example, the MCLPC analysis component 330 may apply the MCLPC coefficient data $g(\tau)$ to each of the raw audio signals (e.g., $y_m(t)$ for the m-th microphone) to generate the raw residual signals (e.g., $r_m(t)$ for the m-th microphone).

As illustrated in FIG. 3, the early reflections filter component 300 processes each of the residual signals 335a-335d individually. Thus, for each residual signal 335, the early reflections filter component 300 includes an LPC coefficients component 340 and a residual Early Reflections Filter (ERF) component 350. For example, the early reflections filter component 300 includes a first LPC coefficients component 340a and a first residual ERF component 350a configured to process the first residual signal 335a.

The first LPC coefficients component 340a may receive the first raw residual signal 335a (e.g., $r_1(t)$) and run a single-channel LPC to generate first room impulse response (RIR) data 345a (e.g., $\{\tilde{h}_1(\tau)\}_{\tau=\tau_0}^{\tau_1}$), as described above with regard to step 218. In some examples, the first LPC coefficients component 340a may generate the single-channel LPC coefficients (e.g., $\alpha=(\alpha_1, \alpha_2 \ldots \alpha_n)^T$) using Equation [1] described above, and may use the LPC coefficients to compute the first RIR data 345a included in Equation [9]. For example, the first LPC coefficients component 340a may compute the LPC coefficients (e.g., autoregressive coefficients) in the range $[\tau_0, \tau_1]$, such that the first RIR data (e.g., $\{\tilde{h}_1(\tau)\}_{\tau=\tau_0}^{\tau_1}$) includes the corresponding LPC coefficients after running LPC analysis with autoregressive model order $\tau_1$. As illustrated in FIG. 3, each of the LPC coefficients components 340 processes a residual signal 335 from an individual microphone 112, and is configured to compute an individual single-channel LPC in order to generate RIR data (e.g., $\{\tilde{h}_m(\tau)\}_{\tau=\tau_0}^{\tau_1}$) corresponding to the residual signal 335.

The first residual ERF component 350a may receive the first raw residual signal 335a and the first RIR data 345a and may generate a first filtered residual signal 355a (e.g., $\tilde{r}_1(t)$), as described above with regard to step 222. For example, the first residual ERF component 350a may use the first raw residual signal 335a and the first RIR data 345a to generate a first reference audio signal that represents the early reflections (e.g., $$\sum_{\tau=\tau_0}^{\tau_1} \tilde{h}_m(\tau) r_m(t-\tau)$$

as shown in Equation [10]. After determining the first reference audio signal, the device 110 may subtract the first reference audio signal from the first raw residual signal 335a to generate the first filtered residual signal 355a. However, the disclosure is not limited thereto and the device 110 may calculate the first filtered residual signal 355a as a single step without departing from the disclosure.

The first residual ERF component 350a may output the first filtered residual signal 355a to the MCLPC synthesis component 360. Thus, the MCLPC synthesis component 360 may receive each of the filtered residual signals 355a-355d from the residual ERF components 350a-350d. The MCLPC synthesis component 360 may also receive the MCLPC coefficient data 325 from the MCLPC coefficients component 320. The MCLPC synthesis component 360 and may be configured to synthesize the filtered residual signals 355 to generate filtered audio data 365 (e.g., $\{\tilde{y}_m(t)\}$). For example, the device 110 may synthesize the filtered residual signals 355a-355d, which no longer contain the early reflections, using the MCLPC coefficient data 325 (e.g., $\{g(\tau)\}_{\tau=1}^{K}$) in order to generate the filtered audio data 365, as described above with regard to step 224.

Figure 4A:
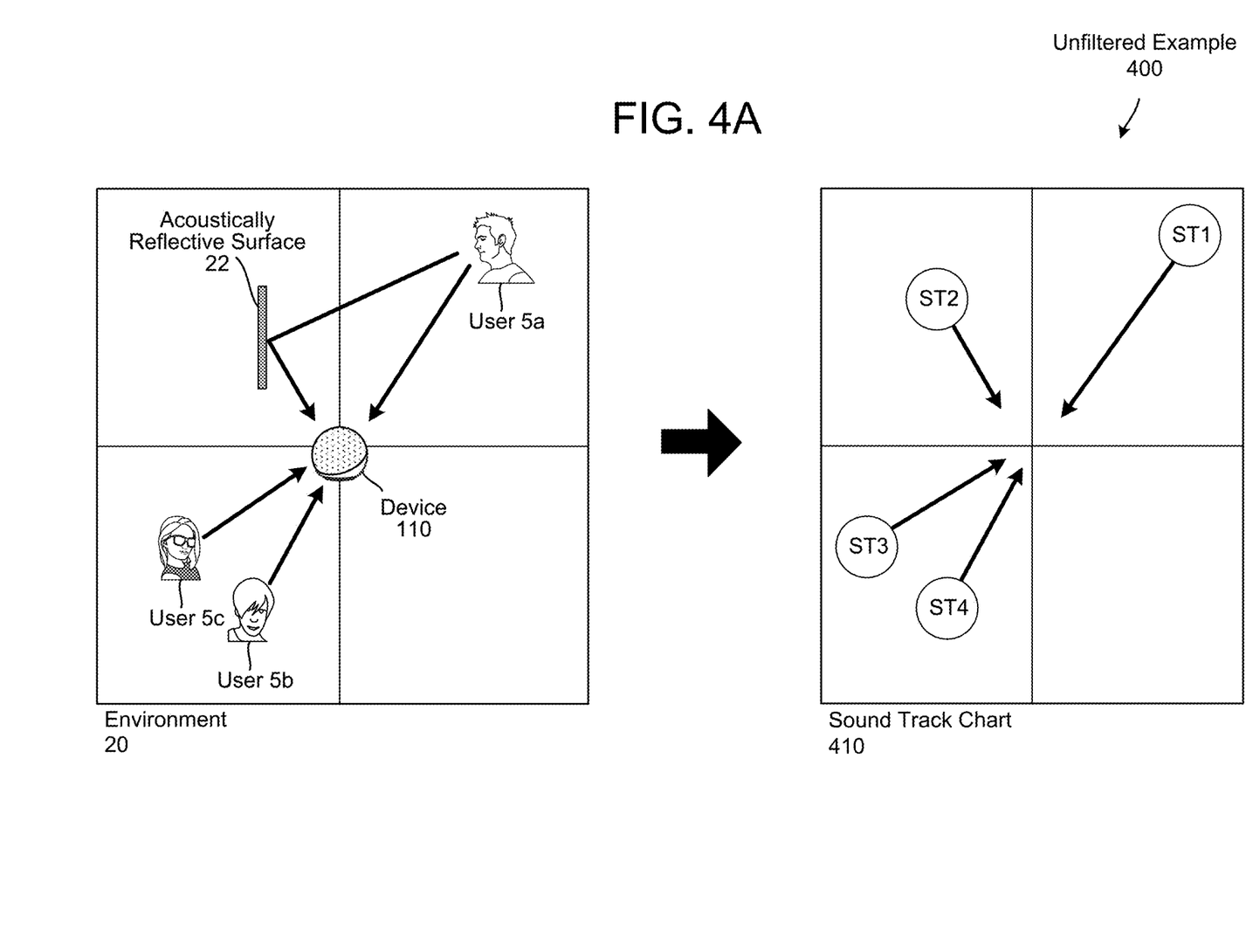
FIGS. 4A-4B illustrate examples of generating sound track data with an early reflections filter according to embodiments of the present disclosure.
Figure 4B:
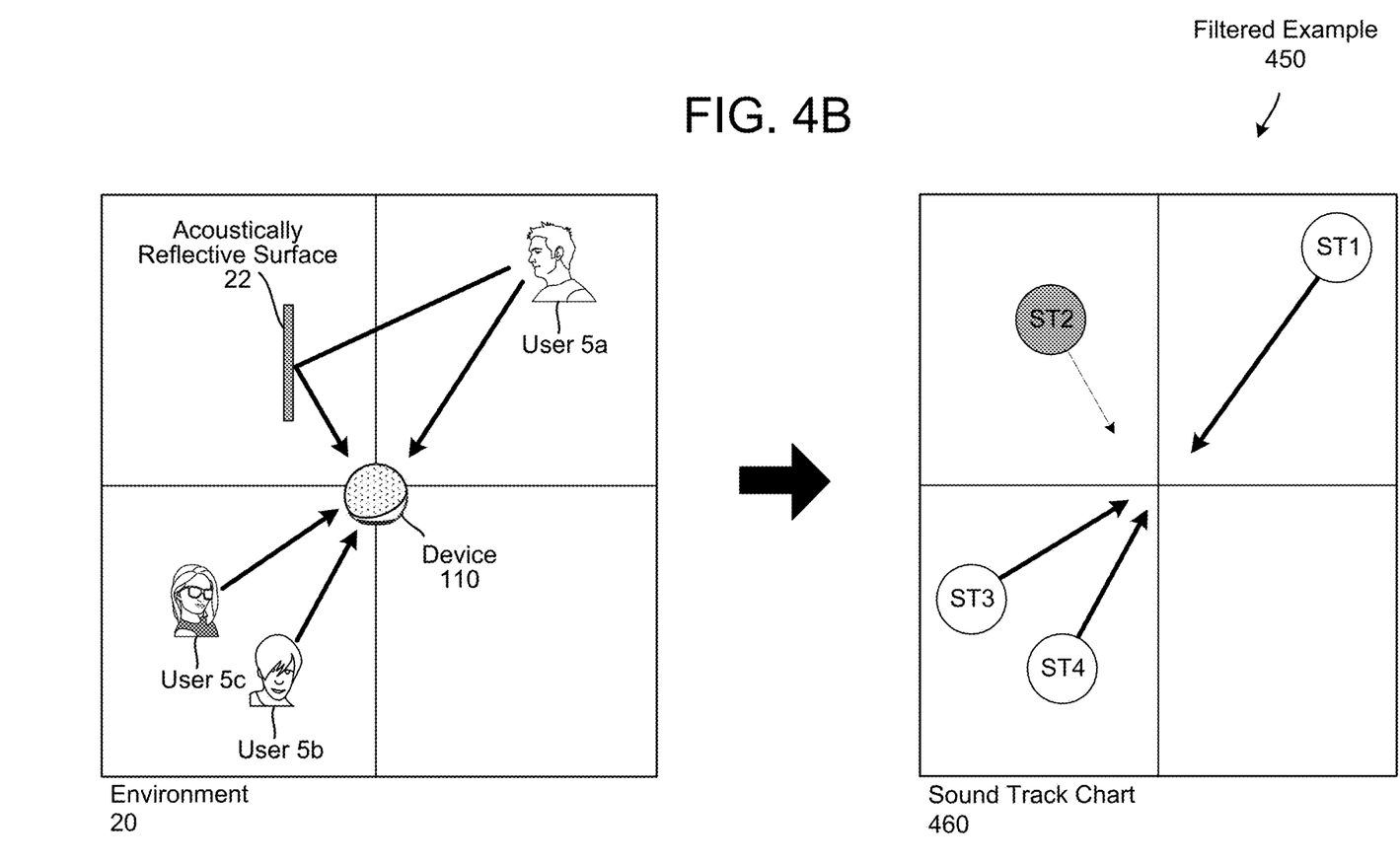

FIGS. 4A-4B illustrate examples of generating sound track data with an early reflections filter according to embodiments of the present disclosure. As shown in the unfiltered example 400 illustrated in FIG. 4A, in some examples the environment 20 may include three sound sources, such as a first user 5a, a second user 5b, and a third user 5c, although the disclosure is not limited thereto. The three sound sources may generate audible sounds (e.g., audible noises) and the device 110 may be configured to capture these audible sounds by generating audio data that includes representations of the audible sounds. However, in addition to capturing direct sound waves corresponding to the audible sounds, the audio data may also include representations of reflected sound waves that reflect off of acoustically reflective surfaces in the environment.

FIG. 4A illustrates an example in which the device 110 is located in proximity to an acoustically reflective surface 22 (e.g., a wall), such that first audible sound(s) generated by the first user 5a may reflect off of the acoustically reflective surface 22 and the device 110 may capture reflection(s) of the first audible sound(s). Thus, the audio data includes a first representation of the first audible sound(s) associated with a first direction (e.g., first user 5a) along with a second representation of the first audible sound(s) associated with a second direction (e.g., acoustically reflective surface 22).

In the unfiltered example 400, the device 110 may process the audio data to identify unique sound sources and determine a direction corresponding to each of the sound sources. For example, the device 110 may identify a first sound source in the first direction (e.g., first user 5a), a second sound source in the second direction (e.g., reflection associated with the acoustically reflective surface 22), a third sound source in a third direction (e.g., third user 5c), and a fourth sound source in a fourth direction (e.g., second user 5b). In some examples, the device 110 may determine the directions associated with each of the sound sources and represent these directions as a value in degrees (e.g., between 0-360 degrees) relative to a position of the device 110, although the disclosure is not limited thereto.

As illustrated in FIG. 4A, the environment 20 described above with regard to FIG. 1 is represented by sound track chart 410, which depicts four different sound source locations relative to the device 110. Thus, the device 110 may generate sound track (ST) data that distinguishes between individual sound sources in the environment 20 and represents each of the sound sources based on a corresponding location. For example, the device 110 may identify a first sound source corresponding to the first user 5a and generate first sound track data ST1 (e.g., a first portion of the ST data) corresponding to first speech generated by the first user 5a, identify a second sound source corresponding to the acoustically reflective surface 22 reflecting the first speech and generate second sound track data ST2 (e.g., a second portion of the ST data), identify a third sound source corresponding to the third user 5c and generate third sound track data ST3 (e.g., a third portion of the ST data) corresponding to second speech generated by the third user 5c, and identify a fourth sound source corresponding to the second user 5b and generate fourth sound track data ST4 (e.g., a fourth portion of the ST data) corresponding to third speech generated by the second user 5b.

As part of identifying unique sound sources, the device 110 may generate sound track data representing sound tracks. For example, the sound track data may include an individual sound track for each sound source, enabling the device 110 to track multiple sound sources simultaneously. The sound track data may represent a sound track using a power sequence as a function of time, with one power value per frame. The power sequence may include one or more peaks, with each peak (e.g., pulse) corresponding to an audible sound.

As described in greater detail below, the device 110 may detect an audible sound by identifying a short power sequence corresponding to a peak and may attempt to match the short power sequence to an already established sound track. For example, the device 110 may compare the short power sequence and a corresponding direction (e.g., direction of arrival associated with the audible sound) to existing sound tracks and match the short power sequence to an already established sound track, if appropriate. Thus, an individual sound track may include multiple audible sounds associated with a single sound source, even as a direction of the sound source changes relative to the device 110. The sound track may describe acoustic activities and have a start time, end time, power, and direction. In some examples, each audible sound (e.g., peak) included in the sound track may be associated with a start time, end time, power, and/or direction corresponding to the audible sound, although the disclosure is not limited thereto.

In contrast to the unfiltered example 400 illustrated in FIG. 4A, FIG. 4B illustrates an example of generating sound track data after performing early reflections filtering as described above with regard to FIGS. 2-3. As a result of the early reflections filter, the device 110 may filter reflections of the first speech, enabling the device 110 to attenuate the second representation of the first audible sound(s) associated with the second direction (e.g., acoustically reflective surface 22).

As illustrated in FIG. 4B, performing early reflections filtering suppresses reflections generated by the acoustically reflective surface 22. For example, FIG. 4B illustrates a filtered example 450 in which the device 110 generates sound track data within the same environment 20 described above with regard to FIG. 4A. Thus, the environment 20 includes three sound sources, such as the first user 5a, the second user 5b, and the third user 5c, along with the acoustically reflective surface 22 that reflects the first speech generated by the first user 5a.

As illustrated in FIG. 4B, the device 110 performs early reflections filtering prior to generating sound track data. For example, the device 110 uses the early reflections filter to attenuate a second audio signal representing the reflections of the first speech, such that a magnitude of the second audio signal is significantly reduced relative to other audio signals associated with direct sound (e.g., incident sound waves) from the sound sources. Thus, the device 110 may identify a first sound source in the first direction (e.g., first user 5a), an attenuated second sound source in the second direction (e.g., acoustically reflective surface 22), a third sound source in the third direction (e.g., third user 5c), and a fourth sound source in the fourth direction (e.g., second user 5b).

As illustrated in FIG. 4B, the device 110 may generate sound track (ST) data that distinguishes between the three sound sources associated with the direct line-of-sight components and the reflections associated with the acoustically reflective surface 22. For example, the sound track chart 460 illustrates that the device 110 may identify a first sound source corresponding to the first user 5a and generate first sound track data ST1 (e.g., a first portion of the ST data) corresponding to first speech generated by the first user 5a, identify an attenuated second sound source corresponding to the acoustically reflective surface 22 and generate second sound track data ST2 (e.g., a second portion of the ST data) corresponding to reflections of the first speech, identify a third sound source corresponding to the third user 5c and generate third sound track data ST3 (e.g., a third portion of the ST data) corresponding to second speech generated by the third user 5c, and identify a fourth sound source corresponding to the second user 5b and generate fourth sound track data ST4 (e.g., a fourth portion of the ST data) corresponding to third speech generated by the second user 5b. Due to the early reflections filter, the second sound source is attenuated, as are any other reflections not illustrated in FIG. 4B, while sound sources associated with a direct line-of-sight component are not affected. As the first sound track data ST1 represents the first speech and the second sound track data ST2 represents reflections of the first speech, this enables the device 110 to select the first sound track data ST1 over the second sound track data ST2 and correctly identify a direction associated with the first user 5a.

Figure 5:
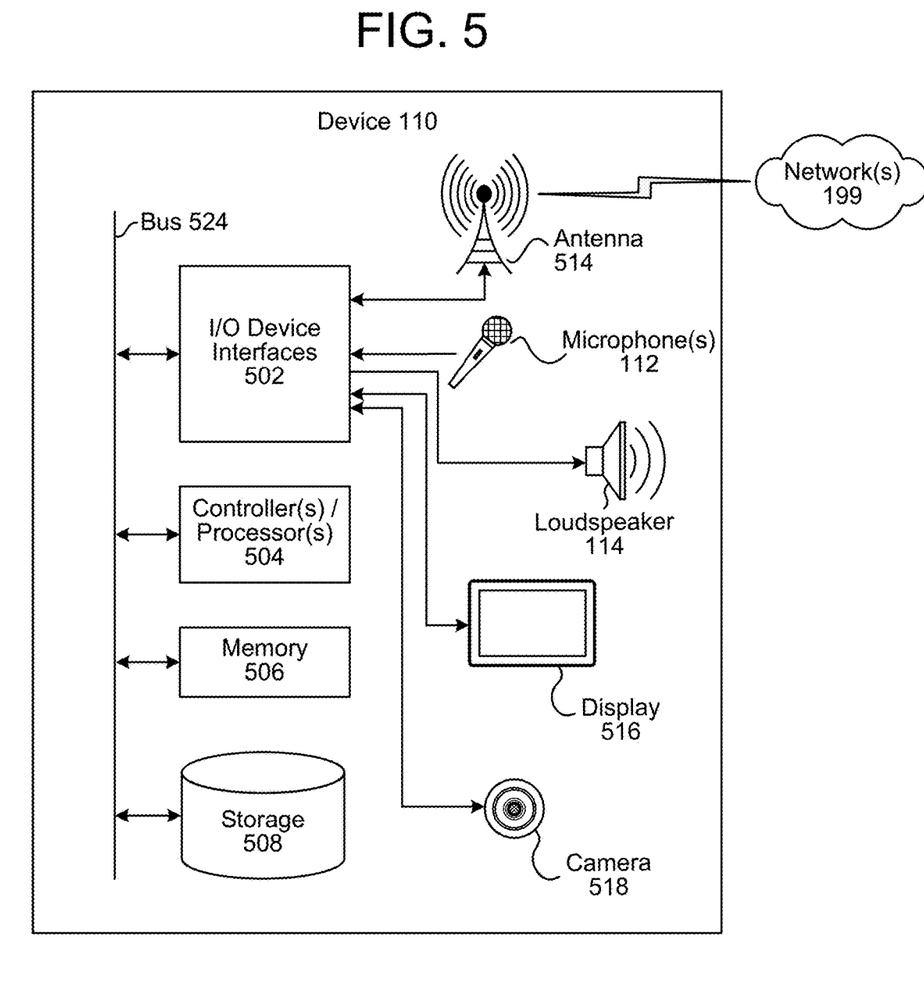
FIG. 5 is a block diagram conceptually illustrating example components of a system according to embodiments of the present disclosure.

FIG. 5 is a block diagram conceptually illustrating a device 110 that may be used with the system. In operation, the system 100 may include computer-readable and computer-executable instructions that reside on the device 110, as will be discussed further below. As illustrated in FIG. 5, each device 110 may include one or more controllers/processors (504), which may each include a central processing unit (CPU) for processing data and computer-readable instructions, and a memory (506) for storing data and instructions of the respective device. The memories (506) may individually include volatile random access memory (RAM), non-volatile read only memory (ROM), non-volatile magnetoresistive memory (MRAM), and/or other types of memory. Each device 110 may also include a data storage component (508) for storing data and controller/processor-executable instructions. Each data storage component (508) may individually include one or more non-volatile storage types such as magnetic storage, optical storage, solid-state storage, etc. Each device 110 may also be connected to removable or external non-volatile memory and/or storage (such as a removable memory card, memory key drive, networked storage, etc.) through respective input/output device interfaces (502).

Computer instructions for operating each device 110 and its various components may be executed by the respective device's controller(s)/processor(s) (504), using the memory (506) as temporary "working" storage at runtime. A device's computer instructions may be stored in a non-transitory manner in non-volatile memory (506), storage (508), or an external device(s). Alternatively, some or all of the executable instructions may be embedded in hardware or firmware on the respective device in addition to or instead of software.

Each device 110 includes input/output device interfaces (502). A variety of components may be connected through the input/output device interfaces (502), as will be discussed further below. Additionally, each device 110 may include an address/data bus (524) for conveying data among components of the respective device. Each component within a device 110 may also be directly connected to other components in addition to (or instead of) being connected to other components across the bus (524).

Referring to FIG. 5, the device 110 may include input/output device interfaces 502 that connect to a variety of components such as an audio output component such as a loudspeaker(s) 114, a wired headset or a wireless headset (not illustrated), or other component capable of outputting audio. The device 110 may also include an audio capture component. The audio capture component may be, for example, microphone(s) 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 516 for displaying content and/or a camera 518 to capture image data, although the disclosure is not limited thereto.

Via antenna(s) 514, the input/output device interfaces 502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (502) may also include communication components that allow data to be exchanged between devices such as different physical servers in a collection of servers or other components.

The components of the device(s) 110 may include their own dedicated processors, memory, and/or storage. Alternatively, one or more of the components of the device(s) 110 may utilize the I/O interfaces (502), processor(s) (504), memory (506), and/or storage (508) of the device(s) 110. As noted above, multiple devices may be employed in a single system. In such a multi-device system, each of the devices may include different components for performing different aspects of the system's processing. The multiple devices may include overlapping components. The components of the device(s) 110, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
receiving, by a device, first audio data, a first portion of the first audio data corresponding to a first microphone and a second portion of the first audio data corresponding to a second microphone;

receiving first coefficient data associated with the first audio data, the first coefficient data calculated for a first number of microphones associated with the device;

generating, using the first portion of the first audio data and the first coefficient data, second audio data corresponding to the first microphone, the second audio data including a first representation of an audible sound and a first representation of an acoustic reflection of the audible sound;

generating, using the second audio data, first impulse response data corresponding to the first microphone; and generating, using the second audio data and a first portion of the first impulse response data, third audio data corresponding to the first microphone, the third audio data including a second representation of the audible sound.

2. The computer-implemented method of claim 1, further comprising:

generating, using the second portion of the first audio data and the first coefficient data, fourth audio data corresponding to the second microphone, the fourth audio data including a third representation of the audible sound and a second representation of the acoustic reflection of the audible sound;

generating, using the fourth audio data, second impulse response data corresponding to the second microphone;

generating, using the fourth audio data and a portion of the second impulse response data, fifth audio data corresponding to the second microphone, the fifth audio data including a fourth representation of the audible sound;

generating a first portion of sixth audio data using the first coefficient data and the third audio data, the first portion of the sixth audio data corresponding to the first microphone; and generating a second portion of the sixth audio data using the first coefficient data and the fifth audio data, the second portion of the sixth audio data corresponding to the second microphone.

3. The computer-implemented method of claim 1, further comprising:

determining a first autocorrelation value associated with the first microphone;

determining a second autocorrelation value associated with the second microphone;

determining a first value of a plurality of autocorrelation values by averaging at least the first autocorrelation value and the second autocorrelation value; and determining the first coefficient data using the plurality of autocorrelation values.

4. The computer-implemented method of claim 1, wherein generating the second audio data further comprises:

determining a first value using a first coefficient of the first coefficient data and the first portion of the first audio data;

determining a second value using a second coefficient of the first coefficient data and the first portion of the first audio data;

determining a third value by summing the first value and the second value; and generating a first portion of the second audio data by subtracting the third value from the first portion of the first audio data.

5. The computer-implemented method of claim 1, wherein:

generating the first impulse response data further comprises generating the first impulse response data by calculating linear prediction coding (LPC) coefficient values for the first microphone; and the method further comprises:

determining the first portion of the first impulse response data using a portion of the LPC coefficient values that are within a first range, the first portion of the first impulse response data corresponding to reflections of the audible sound.

6. The computer-implemented method of claim 1, wherein generating the third audio data further comprises:

determining a first value using the second audio data and a first coefficient of the first portion of the first impulse response data;

determining a second value using the second audio data and a second coefficient of the first portion of the first impulse response data;

determining a third value by summing at least the first value and the second value; and generating a first portion of the third audio data by subtracting the third value from a first portion of the second audio data.

7. The computer-implemented method of claim 1, further comprising:

determining a first value using the third audio data and a first coefficient of the first coefficient data;

determining a second value using the third audio data and a second coefficient of the first coefficient data;

determining a third value by summing at least the first value and the second value; and determining first portion of fourth audio data by adding the third value and a first portion of the third audio data, wherein the first portion of the fourth audio data corresponds to the first microphone and a second portion of the fourth audio data corresponds to the second microphone.

8. The computer-implemented method of claim 1, further comprising:

generating, using the second portion of the first audio data and the first coefficient data, fourth audio data corresponding to the second microphone, the fourth audio data including a third representation of the audible sound; and generating fifth audio data using the first coefficient data, the third audio data, and the fourth audio data, a first portion of the fifth audio data corresponding to the first microphone and a second portion of the fifth audio data corresponding to the second microphone.

9. The computer-implemented method of claim 1, wherein the third audio data corresponds to direct sound waves associated with the audible sound and the first portion of the first impulse response data corresponds to the acoustic reflection of the audible sound.

10. The computer-implemented method of claim 1, wherein the first coefficient data corresponds to multi-channel linear prediction coding (MCLPC) coefficient values corresponding to at least the first microphone and the second microphone.

11. A system comprising:

at least one processor; and memory including instructions operable to be executed by the at least one processor to cause the system to:

receive, by a device, first audio data, a first portion of the first audio data corresponding to a first microphone and a second portion of the first audio data corresponding to a second microphone;

receive first coefficient data associated with the first audio data, the first coefficient data calculated for a first number of microphones associated with the device;

generate, using the first portion of the first audio data and the first coefficient data, second audio data corresponding to the first microphone, the second audio data including a first representation of an audible sound and a first representation of an acoustic reflection of the audible sound;

generate, using the second audio data, first impulse response data corresponding to the first microphone; and generate, using the second audio data and a first portion of the first impulse response data, third audio data corresponding to the first microphone, the third audio data including a second representation of the audible sound.

12. The system of claim 11, wherein the memory further comprises instructions that, when executed by the at least one processor, further cause the system to:

generate, using the second portion of the first audio data and the first coefficient data, fourth audio data corresponding to the second microphone, the fourth audio data including a third representation of the audible sound and a second representation of the acoustic reflection of the audible sound;

generate, using the fourth audio data, second impulse response data corresponding to the second microphone;

generate, using the fourth audio data and a portion of the second impulse response data, fifth audio data corresponding to the second microphone, the fifth audio data including a fourth representation of the audible sound;

generate a first portion of sixth audio data using the first coefficient data and the third audio data, the first portion of the sixth audio data corresponding to the first microphone; and generate a second portion of the sixth audio data using the first coefficient data and the fifth audio data, the second portion of the sixth audio data corresponding to the second microphone.

13. The system of claim 11, wherein the memory further comprises instructions that, when executed by the at least one processor, further cause the system to:

determine a first autocorrelation value associated with the first microphone;

determine a second autocorrelation value associated with the second microphone;

determine a first value of a plurality of autocorrelation values by averaging at least the first autocorrelation value and the second autocorrelation value; and determine the first coefficient data using the plurality of autocorrelation values.

14. The system of claim 11, wherein the memory further comprises instructions that, when executed by the at least one processor, further cause the system to:

determine a first value using a first coefficient of the first coefficient data and the first portion of the first audio data;

determine a second value using a second coefficient of the first coefficient data and the first portion of the first audio data;

determine a third value by summing the first value and the second value; and generate a first portion of the second audio data by subtracting the third value from the first portion of the first audio data.

15. The system of claim 11, wherein the memory further comprises instructions that, when executed by the at least one processor, further cause the system to:

generate the first impulse response data by calculating linear prediction coding (LPC) coefficient values for the first microphone; and determine the first portion of the first impulse response data using a portion of the LPC coefficient values that are within a first range, the first portion of the first impulse response data corresponding to reflections of the audible sound.

16. The system of claim 11, wherein the memory further comprises instructions that, when executed by the at least one processor, further cause the system to:

determine a first value using the second audio data and a first coefficient of the first portion of the first impulse response data;

determine a second value using the second audio data and a second coefficient of the first portion of the first impulse response data;

determine a third value by summing at least the first value and the second value; and generate a first portion of the third audio data by subtracting the third value from a first portion of the second audio data.

17. The system of claim 11, wherein the memory further comprises instructions that, when executed by the at least one processor, further cause the system to:

determine a first value using the third audio data and a first coefficient of the first coefficient data;

determine a second value using the third audio data and a second coefficient of the first coefficient data;

determine a third value by summing at least the first value and the second value; and determine a first portion of fourth audio data by adding the third value and a first portion of the third audio data, wherein the first portion of the fourth audio data corresponds to the first microphone and a second portion of the fourth audio data corresponds to the second microphone.

18. The system of claim 11, wherein the memory further comprises instructions that, when executed by the at least one processor, further cause the system to:

generate, using the second portion of the first audio data and the first coefficient data, fourth audio data corresponding to the second microphone, the fourth audio data including a third representation of the audible sound; and generate fifth audio data using the first coefficient data, the third audio data, and the fourth audio data, a first portion of the fifth audio data corresponding to the first microphone and a second portion of the fifth audio data corresponding to the second microphone.

19. The system of claim 11, wherein the third audio data corresponds to direct sound waves associated with the audible sound and the first portion of the first impulse response data corresponds to the acoustic reflection of the audible sound.

20. The system of claim 11, wherein the first coefficient data corresponds to multi-channel linear prediction coding (MCLPC) coefficient values corresponding to at least the first microphone and the second microphone.

* * * * *